United States Patent [19]
MacGregor

[11] Patent Number: 5,213,378
[45] Date of Patent: * May 25, 1993

[54] FLUID CONNECTOR

[75] Inventor: James D. MacGregor, Cuyahoga Falls, Ohio

[73] Assignee: The B. F. Goodrich Company, Akron, Ohio

[*] Notice: The portion of the term of this patent subsequent to May 29, 2007 has been disclaimed.

[21] Appl. No.: 756,664

[22] Filed: Sep. 9, 1991

Related U.S. Application Data

[62] Division of Ser. No. 360,689, Jun. 2, 1989, abandoned.

[51] Int. Cl.⁵ .................................................. F16L 3/04
[52] U.S. Cl. ........................................ 285/158; 285/205; 285/222; 285/382.5
[58] Field of Search ............... 285/158, 222, 382.5, 285/205, 382.4, 155, 915; 137/318; 29/509, 523

[56] References Cited

U.S. PATENT DOCUMENTS

| | | | |
|---|---|---|---|
| 550,914 | 12/1895 | Hoyt | 285/158 |
| 2,137,223 | 2/1938 | Baxter | 285/158 |
| 2,690,279 | 9/1954 | Ward | 137/318 |
| 2,823,724 | 9/1955 | Gill | 285/382 |
| 3,754,731 | 8/1973 | Mackal et al. | 285/222 |
| 3,841,667 | 10/1974 | Sonds | 285/222 X |
| 3,984,132 | 10/1976 | Sarson | 285/222 |
| 3,986,734 | 10/1976 | Davis | 285/158 |
| 4,615,545 | 10/1986 | Cruse | 285/158 |
| 4,929,001 | 5/1990 | Phillips | 285/222 X |

FOREIGN PATENT DOCUMENTS

| | | | |
|---|---|---|---|
| 395285 | 12/1908 | France | 285/222 |
| 0599652 | 1/1926 | France . | |
| 0236308 | 7/1925 | United Kingdom . | |

Primary Examiner—Dave W. Arola
Attorney, Agent, or Firm—Joseph Januszkiewicz

[57] ABSTRACT

A fluid connector consisting of a longitudinally extending tubular member having a central passageway extending therethrough with the one end of such central passageway being threaded. An annular flange on the intermediate exterior portion divides the tubular member into an upper portion and a lower portion, which lower portion has a thin walled portion that extends from the flange to the one threaded end portion. The upper exterior portion of the tubular member is threaded to facilitate connection to a threaded conduit. The thin walled lower portion is subject to being upset for cooperation with the flange to secure the tubular connector to a fluid line. Such flange is subjected to a bending to complement the exterior contour of the conduit receiving such connector.

6 Claims, 2 Drawing Sheets

FLUID CONNECTOR

This is a division of pending application Ser. No. 07/360,689 filed Jun. 2, 1989 and now abandoned.

BACKGROUND OF THE INVENTION

This invention relates to a fluid connector and more particularly to a new and improved fluid tubular connector and a new and improved method for installing such fluid connector to a cylindrical pipe, manifold or conduit.

In the installation of fluid connectors onto conduits or manifolds, considerable attention was directed to design the manifolds as well as the conduits to make them sufficiently thick walled to provide means for threadedly attaching the connectors thereto, however in many instances it was difficult to effect a leak proof installation of the fluid connector because the wall thickness of the manifold or conduit was not sufficiently thick to accommodate a threaded connector where high torques and pressures were involved except by installing an auxiliary device. In addition, difficulty was encountered in installing these connectors as the wall thicknesses became thinner in cross section. The solution of welding, soldering or brazing the connectors to the manifolds or conduits were generally unacceptable due to their oxidation and subsequent need for resurfacing of the connectors and the adjacent areas of the manifolds or conduits.

It is an object of this invention to provide a simple structured tubular connector for installation that can be done rapidly and expeditiously while effecting a fluid tight seal including the installation to thin walled vessels, manifolds and conduits in a cost effective manner without injury or damage to the surface finish. The fluid connector of the present invention is a compact simple structure that does not require many parts for assemblage which would be time consuming. The installation of the fluid connector is characterized by its ability to be installed at a site where there is limited clearance space for maneuvering the tools of installation.

SUMMARY OF THE INVENTION

A fluid connector for use with a manifold or a circular conduit wherein the connector is a tubular member with an annular deformable flange on the intermediate exterior portion thereof and with a central passageway extending therethrough. That portion to one side of the flange has exterior threads for connection to a threaded conduit and that portion to the other side of the deformable flange has a lower internal portion of the passageway threaded to facilitate the upsetting of a smooth thin walled portion located between the flange and the threaded passageway portion. During upsetting of the thin walled portion the deformable flange assumes the contour of the adjacent abutting surface while the upset portion of the thin walled section also is deformed to the contour of its abutting surface.

DETAILED DESCRIPTION

Figure 1:
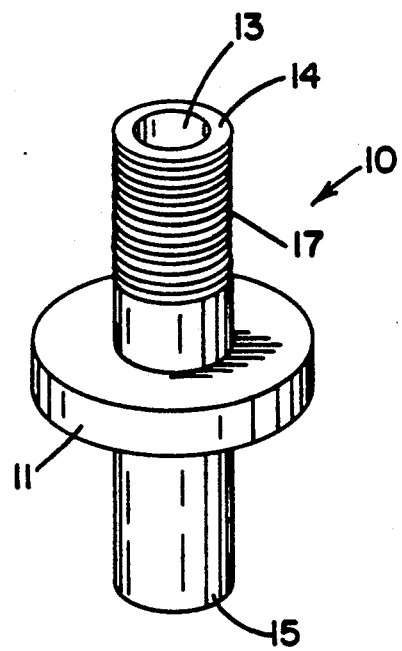
FIG. 1 is a perspective side elevational view of the invention.

Referring to the drawings wherein like reference numerals refer to like elements in the several views, there is shown in FIG. 1 a longitudinally extending fluid connector or tubular member 10 with an annular flange 11 at the intermediate exterior portion thereof. The fluid connector is for installation on the curved wall 12 of a manifold or cylindrical conduit as shown in FIGS. 3 through 7.

Figure 2:
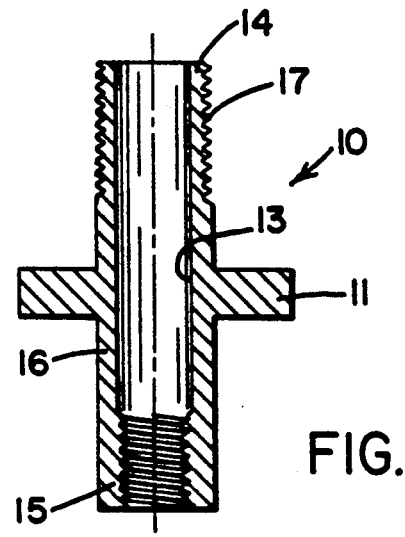
FIG. 2 is a longitudinal sectional view through the fluid connector of the invention.

The fluid connector or tubular member 10 has a narrow central longitudinally extending passageway 13 extending from one end 14 to an internally threaded portion 15 located at the other end. The inside wall surface of the passageway is smooth from the one end 14 to the threaded other end portion 15. The wall thickness of fluid connector 10 between the flange 11 and the threaded portion 15 is much thinner in cross section than the wall thickness of the threaded portion 15 to facilitate the upsetting of such thin walled portion designated 16 in FIG. 2. Such passageway 13 from the one end 14 to the threaded portion 15 is of the same internal diameter for the full length thereof. The upper major exterior portion of the fluid connector 10 (as viewed in FIG. 2) is threaded as at 17. Such threaded portion is followed by a smooth cylindrical exterior portion that extends to the flange 11.

Figure 3:
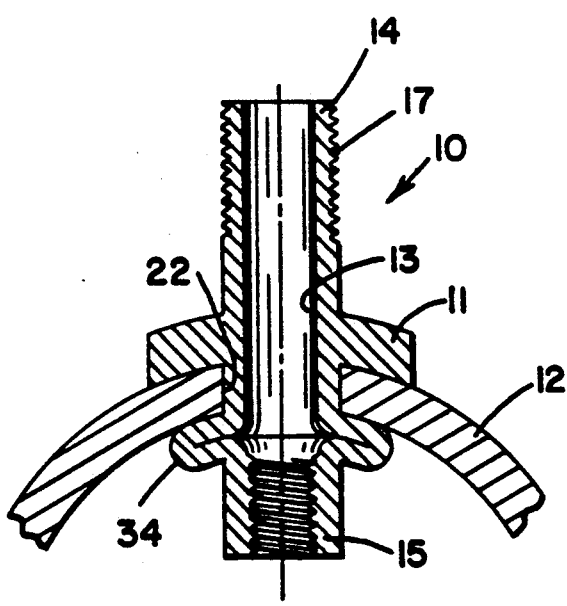
FIG. 3 is a longitudinal sectional view of the fluid connector shown installed in the thin wall section of a conduit.
Figure 4:
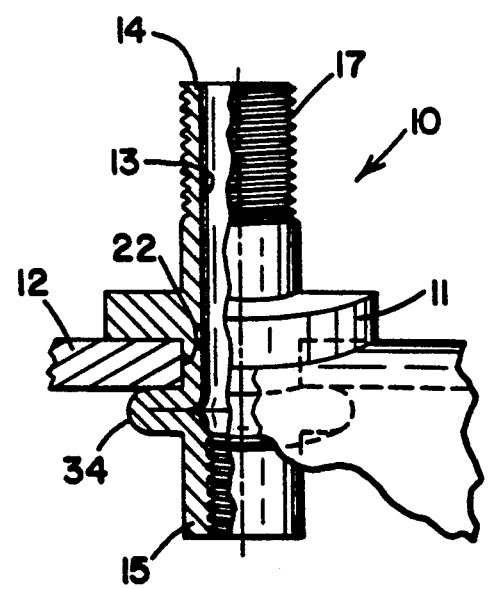
FIG. 4 is longitudinal view of the installed fluid connector similar to that shown in FIG. 3 but put thereof in full and a part thereof in cross section.
Figure 5:
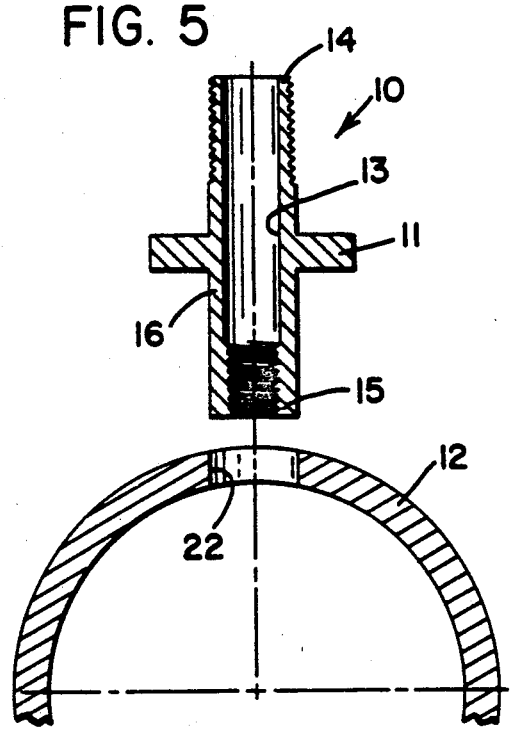
FIG. 5 is a side elevational view in cross section of the fluid connector being moved into position for installation on a cylindrical conduit, shown only partially and in cross section.
Figure 6:
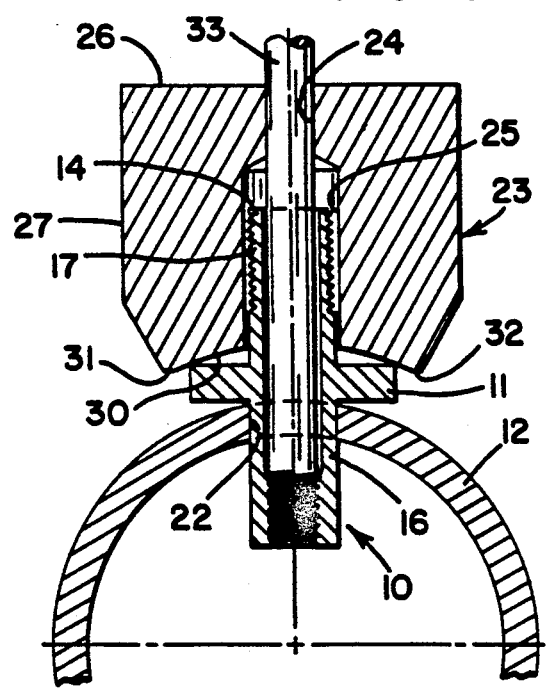
FIG. 6 is a side elevational view in cross section of the fluid connector positioned in the conduit with an anvil positioned on the connector.
Figure 7:
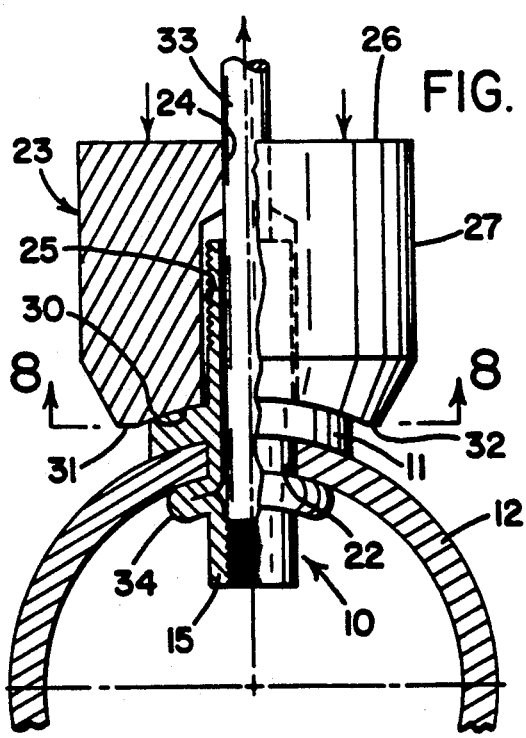
FIG. 7 is a side elevational view partly in cross section showing the upsetting tool and anvil in the final stage for installation of the fluid connector.
Figure 8:
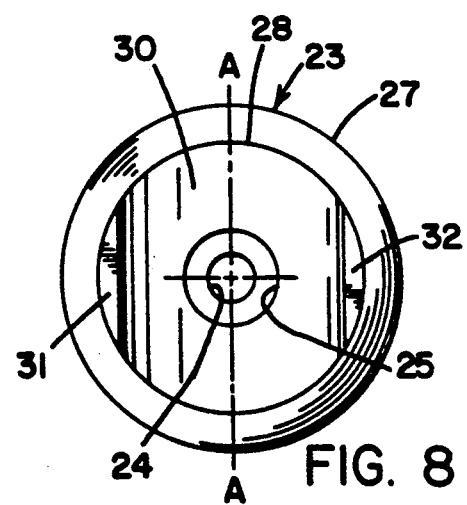
FIG. 8 is a view of the anvil looking up at the bottom end thereof taken on line 8—8 of FIG. 7.

To effect the installation of the fluid connector to the cylindrical wall 12 of a manifold or the cylindrical wall 12 of a conduit, a hole 22 is first drilled through the wall 12 at the desired location. The fluid connector 10 is then positioned in alignment with the hole 22 as shown in FIG. 5 such that a portion of the flange 11 of the fluid connector 10 will come to rest against the exterior surface of the wall 12 adjacent to the hole 22 and the internally threaded portion 15 will project into the chamber of the conduit or manifold as shown in FIG. 6. A tubular anvil 23 is then positioned onto the flanged portion 11 of the fluid connector 10. Anvil 23 as viewed in FIG. 6 has a stepped bore with a narrow portion 24 at the upper end and a greater diameter bore portion 25 extending through the intermediate portion and the lower end portion. The bore portion 25 is of sufficient diameter to provide clearance space to receive the threaded end portion 17 of the fluid connector 10 without marring the threads thereof. The top surface 26 of the anvil is a smooth annular surface whereas the bottom surface of the anvil tapers from outer exterior cylindrical surface 27 (note FIGS. 7 and 8) to a circumferential line 28 designated in FIG. 8. The main bottom body surface of the anvil is of a concave configuration designated 30 and as seen in FIG. 8 curves arcuately away from a line A—A (that is perpendicular to the axis of bore 25) that lies along the uppermost crest of the cylindrical conduit wall 12 as well as longitudinal center line of the uppermost portion of the concave surface 30. As shown in FIG. 8 the bottom surface of the anvil has a pair of spaced flat surfaces 31 and 32 which are not material since these surfaces do not contact the flange 11 as the arcuate concave surface 30 is of sufficient dimension to be able to contact the entire surface of flange 11 for the intended purpose of deforming flange 11. A draw rod 33 of an upsetting tool is then threadedly connected to the threaded portion 15 of the fluid connector 10 as illustrated in FIG. 6. As the draw rod 33 is moved upwardly relative to the wall 12 adjacent to hole 22, a downward equal pressure is exerted on the anvil 23 so that on continued upward movement of draw rod 33, such draw rod 33 will cause the thin walled portion 16 that lies between the flange 11 and the threaded portion 15 to buckle forming an annular bulged portion 34, which bulged or buckle portion 34 in cooperation with the flange 11 captively secures the hose connector 10 to the wall 12 as shown in FIGS. 3 and 7. Simultaneously with this above described upsetting action by draw rod 33 tubular anvil 23 is moved in an opposite direction to draw rod 33, which is a downward action as viewed in FIGS. 6 and 7, whereby the arcuately curved surface or the concave portion 30 of anvil 23 bends the flange 11 to match the curvature of the conduit wall 12 receiving the connector 10. The flange is sufficiently thin and made from a deformable material to permit the bending or deformation thereof to help effect the sealing action of the fluid connector 10. The body portion of the fluid connector or tubular member 10 and the flange 11 is made of stiff expansible or deformable material capable of limited permanent compression or deformation and of effecting elastic resistance to return from the deformed shape or state and also capable of bending under the application of the forces to the body as described. With these simultaneous actions of bending the flange 11 and the buckling of the thin walled portion 16 of the connector 10, the fluid connector 10 is firmly and securely fastened to the conduit without the need for tapping of threads into hole 22 while effecting a secure fit of the connector which effectively resists the torque applied to the threads 17 on the upper exterior threaded portion of the fluid connector 10. An annular gasket may be placed between the annular flange 11 and the exterior cylindrical surface of the conduit wall 12 prior to the upsetting action of the thin walled portion 16 of the connector 10 and bending of the annular flange 11 to shape the flange 11 in the cylindrical configuration of the conduit wall. The longitudinal length of the thin walled portion of the hose connector 10 between flange 11 and the threaded portion 15 is sufficiently long to permit the buckling of the thin walled portion 16.

It will be apparent that, although a specific embodiment has been described in detail, the invention is not limited to the specifically illustrated and described construction since variations may be made without departing from the principles of the invention.

I claim:

1. A fluid connector for connecting a fluid line to a conduit consisting of a longitudinally extending tubular member, said member having an annular deformable flange along the intermediate external portion of said tubular member, a central passageway extending longitudinally from one end of said connector to the other end of said connector, the portion of said passageway extending from said flange to said one end of said tubular member having a smooth walled portion and a threaded portion, said smooth walled portion lying closer to said flange than said threaded portion, said threaded portion lying adjacent to said one end, the wall thickness of said smooth walled portion that lies between said flange and said threaded portion of said tubular member being thinner in cross-section than said threaded portion to facilitate upsetting of said thin smooth walled portion, and the external end portion of said tubular member lying adjacent to said other end of said tubular member being threaded to facilitate the reception of the threaded end of a conduit.

2. A fluid connector as set forth in claim 1 wherein said annular flange of said tubular connector has a concave shape for mating with an curved exterior surface of a conduit.

3. A fluid connector as set forth in claim 2 wherein said exterior thread extend for substantially the full length from said other end of said tubular member to said flange.

4. A fluid connector as set forth in claim 3 wherein said thin smooth walled portion is substantially thinner in cross section relative to the remainder of said central passageway.

5. A fluid connector for a fluid line consisting of a longitudinally extending tubular member with a passageway therethrough, a thin walled cylindrical conduit with an external surface, a hole extending through said thin walled conduit for communicating with the interior of said conduit, said tubular member having an annular circumferentially extending concave shaped flange along the intermediate external portion thereof in abutting contact with said external cylindrical surface of said conduit, said tubular member having a lower portion extending through said hole and into said conduit, said tubular member having an upper external threaded portion that lies externally relative to said conduit, said passageway in said lower portion of said tubular member adjacent its end being threaded, the lower portion of said tubular member lying between said flange and said threaded portion being an arcuately shaped bulged portion, said bulged portion abuts said conduit on the inner surface thereof and is opposite to said external arcuately shaped flanged portion that is adjacent to said hole, and said upper external threaded portion of said tubular member facilitating the attaching of said tubular connector to a threaded conduit.

6. A tubular connector as set forth in claim 5 wherein an annular deformable gasket is in captive abutting engagement between said annular flange and said external surface of said conduit adjacent to said hole.

* * * * *